Jan. 16, 1945.                    W. C. BEACH                       2,367,259
                      LOCK NUT AND METHOD OF MAKING SAME
                              Filed May 30, 1944
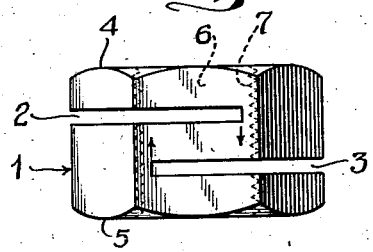
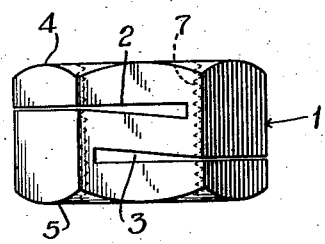
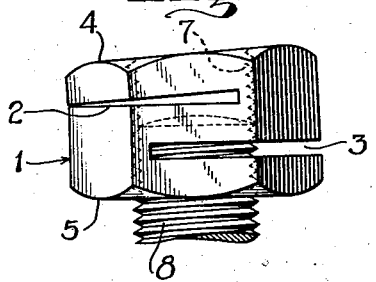
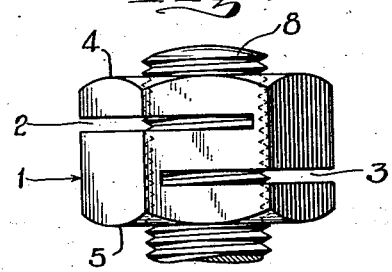
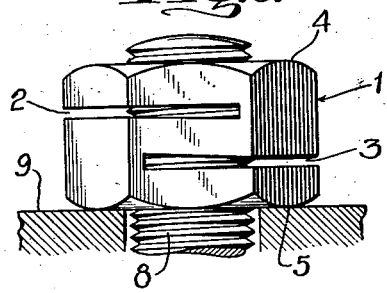
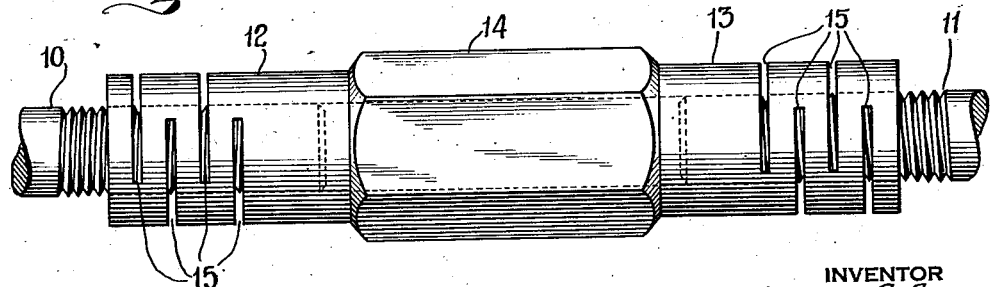
INVENTOR
WILLARD C. BEACH
ATTORNEYS Patented Jan. 16, 1945

2,367,259

UNITED STATES PATENT OFFICE 2,367,259

LOCK NUT AND METHOD OF MAKING SAME

Willard C. Beach, Montville, N. J.

Application May 30, 1944, Serial No. 538,044

7 Claims. (Cl. 151—21)

This invention relates to lock-nuts, which designation is used herein to include the usual types of hex nut and nuts of other contours, and also other similar threaded fastening devices such as turn buckles.

The primary object of the invention is a highly effective, multiple-lock lock nut, of one-piece construction, capable of frequent application to and removal from its bolt or stud without material loss of locking efficiency, and capable of manufacture at lower cost than sundry lock nuts now in common use. These and other objects and advantages of the invention will be apparent from the following description and the accompanying drawing.

In the drawing, Figs. 1 and 2 are elevations of an illustrative type of nut according to the invention, the nut being shown in its preliminary and completed form, respectively; Figs. 3, 4 and 5 illustrate the same nut in various stages of application to a threaded stem; and Fig. 6 is an elevation of a turn buckle having one form of the invention applied thereto.

The initial step in the manufacture of a lock nut according to the present invention consists in taking a unt of the desired contour and dimensions and slotting it transversely at a plurality of points throughout its length and alternately, first from one side and then from the other side of the nut, so as to divide the nut, lengthwise, into a plurality of oppositely directed, connected sections. This is illustrated in preferred form in Fig. 1, in which a hex nut 1 is provided with two transverse slots, 2 and 3, penetrating the nut from opposite sides intermediate the center of the nut and its opposite end faces 4 and 5 and parallel thereto. As shown, each slot extends into the nut beyond the center of the hole 6 but stops short of the thread 7 on the side of the hole opposite to or remote from the slot entrance. By this means the nut is divided into upper, lower and intermediate sections but the portion of the thread opposite each slot is preserved. This has been found to be of prime importance in preserving the lead for the stud or threaded stem to which the nut is to be applied.

The next and final step in the manufacture of the lock nut consists in subjecting the nut to high compression applied simultaneously as an over-all pressure against the opposite end faces of the nut and axially of the center hole. This can be accomplished in quantity by inserting a large number of the slotted nuts in a suitable press and compressing them all at one time. In the result, the nut assumes the form shown in Fig. 2, in which while the end faces of the nut are still parallel, its over-all length has been reduced by what amounts to a bodily skewing of the central or intermediate section. In other words, while the end faces of the nut are still parallel and square to the major portion of the length of the axis of the center hole, the intermediate section itself has now taken a set with the axis of its hole out of square to the other said faces. While somewhat difficult to illustrate, the nature of the bodily distortion of the nut effected by its described over-all compression is indicated by the arrows in Fig. 1.

It has been found that the best results are obtained when the slot spacings, i. e. the thicknesses of the several sections formed by the slots, are equal or at least symmetrical, as, for example, when the upper and lower sections are of equal thickness, which need not necessarily be the same as that of the central or intermediate section. Preferably, the intermediate section is of less rather than greater thickness than the end sections, and the pitch of the thread so related to the thickness of the several sections that the circumferential thread length contained in each section is not less than two and one quarter times the circumference of the center hole.

The nut is now ready for use, and as will be seen in the premises, it can be finger started on its stud from either end just like any ordinary nut, since the end sections themselves have not been distorted. For this same reason the nut starts squarely on its stem and can as quickly and conveniently be applied as any ordinary nut. However, the major circumferential portion of the thread of the intermediate section is now biased or canted with respect to the original pitch, and, accordingly, resistance to turning is encountered as soon as the stud reaches this intermediate section and a wrench is required to turn the nut beyond that point. The ensuing action is illustrated in Figs. 3, 4 and 5.

As the nut is further turned on the stud or threaded stem 8, the compression set of the intermediate section is overcome (the stud continuing its true lead by reason of the unbroken thread on the side of the center hole remote from the slot entrance) and the intermediate section is forced back to parallel relationship to the lower section. This is illustrated in Fig. 3. After the nut has been turned on the stud clear through the intermediate section, the stud encounters the still-distorted upper section (i. e. still-distorted relatively to the intermediate section) and in turn forces the upper section back to its original parallel relationship to the other two sections. This is illustrated in Fig. 4.

There is thus provided a powerful, dual-gripping or locking action entirely adequate to resist any tendency of the nut to shift when subjected to severe vibration. Also, the resiliency of the pre-set of the sections imparted in the manner described is such that although requiring a wrench for the purpose, the nut can be applied and removed a great many times without any appreciable diminution of its locking action. A further feature of importance which will be noted resides in the fact that the efficacy of the locking is not dependent, as it is with the majority of lock nuts, upon the nut being "turned home" tight against an abutting surface. When once it has been wrench-turned upon the stud it locks wherever it stops, thereby avoiding such accidents and structural break-downs as are sometimes encountered with other types of lock nut as the result of the failure of the mechanic to turn the nut "home."

A still further characteristic of the nut is illustrated in Fig. 5 in which is shown the action that occurs when the nut is actually "turned home" tight against an abutting face such as indicated at 9. As there shown the result of so tightening the nut against the stationary face 9 is to effect a still further locking action, in that the intermediate section of the nut and the lower section abutting face 9 are forced together, or biased to grip the stud thread still tighter. In effect, what may be termed a triple lock is thus provided.

In Fig. 6 of the drawing a form of the invention is shown applied to a turnbuckle uniting threaded stems 10 and 11. In this instance the collar extensions 12 and 13 of the central nut portion 14 are provided with a plurality of slots 15 dividing the collars into a number of sections preformed and functioning just as in the type of nut already described. This particular application of the invention well illustrates the above-mentioned advantage of the self-locking character of the nut, i. e. its ability to grip and lock at any point on a stud or other threaded member without requiring the cooperation of any stationary abutment surface.

The following is claimed:

1. The method of making a lock nut which comprises forming a plurality of slots which overlap substantially throughout the diameter of the center hole of the nut by transversely slotting a nut intermediate the center and one end thereof, from one side of the nut, through the center of its hole and to a depth short of but adjacent to the threads on the far side of the hole from the slot entrance, similarly slotting the nut intermediate the center and the other end thereof and from the opposite side of the nut from the first slot, applying over-all pressure to the end faces of the nut to reduce the distance between such faces by skewing the portion of the nut intermediate the slots without disturbing the original parallelism of the said end faces.

2. A lock nut having two transverse slots penetrating the nut from opposite sides thereof, each slot of a depth to extend beyond the center of the nut hole but terminating short of the threads on the far side of the hole from the slot entrance, the said slots overlapping substantially throughout the diameter of the center hole and spaced to divide the nut into three substantial equal sections, the end faces of the nut being substantially parallel, and the center section and its slot faces being resiliently pre-set at an acute angle to the other said faces.

3. A lock nut having two transverse slots penetrating the nut from opposite sides thereof, each slot of a depth to extend beyond the center of the nut hole to a point adjacent to but short of the threads on the far side of the hole from the slot entrance, the said slots overlapping substantially throughout the diameter of the center hole and spaced to divide the nut into three sections of which the outer two are of substantially equal thickness, the end faces of the nut being substantially parallel, and the center section being resiliently pre-set with the axis of its center hole out of normal to the planes of said faces.

4. A lock nut having two transverse slots penetrating the nut from opposite sides thereof, each slot of a depth to extend beyond the center of the nut hole to a point adjacent to but short of the threads on the far side of the hole from the slot entrance, said slots overlapping substantially throughout the diameter of the center hole, the end faces of the outer portions of the nut formed by said slots being substantially parallel, and the intermediate section being resiliently pre-set with the axis of its center hole out of normal to the planes of said faces.

5. A lock nut having transverse slots penetrating the nut alternately from opposite sides thereof, each slot of a depth to extend beyond the center of the nut hole to a point adjacent to but short of the threads on the far side of the hole from the slot entrance, said slots overlapping substantially throughout the diameter of the center hole, the pitch of the thread being so related to the thickness of each section on opposite sides of a slot that the circumferential thread length remaining in each such section is not less than two and one quarter times the circumference of the hole, the outer faces of both the end sections of the nut being substantially parallel and a section of the nut intermediate slots being resiliently pre-set with the axis of its center hole out of normal to the planes of the said faces.

6. A lock nut having transverse slots penetrating the nut alternately from opposite sides thereof, each slot of a depth to extend beyond the center of the nut hole to a point adjacent to but short of the threads on the far side of the hole from the slot entrance, the said slots overlapping substantially throughout the diameter of the center hole and thereby dividing the nut length into a plurality of oppositely-projecting, interconnected sections, the outer faces of both the end sections of the nut being substantially parallel and a section of the nut between slots being resiliently pre-set at an acute angle to such parallel faces.

7. A lock nut having transverse slots penetrating the nut alternately from opposite sides thereof, each slot of a depth to extend beyond the center of the nut hole to a point adjacent to but short of the threads on the far side of the hole from the slot entrance, the said slots overlapping substantially throughout the diameter of the center hole and thereby dividing the nut length into a plurality of oppositely-projecting, interconnected sections, the outer face of an end section of the nut being square to the major length of the axis of the hole, and an intermediate section of the nut being resiliently pre-set with the axis of its hole out of normal to the plane of said outer face.

WILLARD C. BEACH.